(12) United States Patent
Kuehbauch

(10) Patent No.: US 6,634,054 B2
(45) Date of Patent: Oct. 21, 2003

(54) WINDSHIELD WIPER DRIVE

(75) Inventor: Gerd Kuehbauch, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/979,458

(22) PCT Filed: Mar. 10, 2001

(86) PCT No.: PCT/DE01/00917

§ 371 (c)(1),
(2), (4) Date: Mar. 4, 2002

(87) PCT Pub. No.: WO01/68422

PCT Pub. Date: Sep. 20, 2001

(65) Prior Publication Data

US 2003/0005539 A1 Jan. 9, 2003

(30) Foreign Application Priority Data

Mar. 17, 2000 (DE) .......................... 100 13 202

(51) Int. Cl.[7] .............. B60S 1/32; B60S 1/06; B60S 1/24
(52) U.S. Cl. ................. 15/250.21; 15/250.31
(58) Field of Search ............. 15/250.21, 250.23, 15/250.351, 250.31, 250.352

(56) References Cited

U.S. PATENT DOCUMENTS

| 4,683,605 | A | * | 8/1987 | Leroy et al. ............. 15/250.21 |
| 4,720,885 | A | * | 1/1988 | Leroy et al. ............. 15/250.21 |
| 4,776,057 | A | * | 10/1988 | Beneteau et al. ........ 15/250.21 |
| 5,860,186 | A | * | 1/1999 | Schail et al. ............. 15/250.21 |
| 5,884,357 | A | * | 3/1999 | Schill et al. ............. 15/250.21 |

* cited by examiner

*Primary Examiner*—Gary K. Graham
(74) *Attorney, Agent, or Firm*—Kenyon & Kenyon

(57) ABSTRACT

In the case of a windshield wiper drive having a swivelably mounted drive shaft, a drive rocker arm that is immovably attached thereto, a connecting lever which is attached to the drive rocker arm via a first joint, a support rocker arm which is connected to the connecting lever via a second joint and mounted via a joint, and a windshield wiper arm which is connected to the connecting lever, an object is to prevent distortion in the drive, while keeping production expenditures to a minimum. To accomplish this, one of the two joints of the connecting lever is swivelable in a plane that is defined by the axis of rotation of the accompanying rocker arm and by the corresponding joint, and the other joint is fixed in a plane that is defined by the axis of rotation of the accompanying rocker arm and by the joint.

6 Claims, 6 Drawing Sheets

WINDSHIELD WIPER DRIVE

FIELD OF THE INVENTION

The present invention relates to a windshield wiper drive having a swivelably mounted drive shaft, a drive rocker arm immovably attached thereto, a connecting lever which is connected to the drive rocker arm via a first joint, a support rocker arm which is connected to the connecting lever via a second joint and is mounted via blind joint, and a windshield wiper arm that is connected to the connecting lever.

BACKGROUND INFORMATION

A windshield wiper drive is described in European Patent No. 0 182 123. It is used to move a windshield wiper blade attached to a windshield wiper arm in a back-and-forth movement across a windshield to be cleaned. To keep distortion from arising in the mechanism, which includes a drive rocker arm, a connecting lever, and a support rocker arm and is based on a four-joint mechanism, a fifth joint that divides the connecting lever into two sections that can be moved relative to one another is provided. The disadvantage of this is that it is relatively expensive to produce. Furthermore, using a fifth joint on the connecting lever is disadvantageous in terms of visual attractiveness.

SUMMARY OF THE INVENTION

An object of the present invention is to further refine a windshield wiper drive of the type described above so that it has a simpler design and is visually more attractive.

The windshield wiper drive has the advantage that either there is no need at all for the fifth joint, which means the design is simplified, or the fifth joint at least does not have to be arranged on the connecting lever but rather can be arranged on the drive rocker arm or the support rocker arm. Thus it is in a visually less obtrusive area when the windshield wiper drive is viewed.

According to a preferred embodiment of the present invention, the drive rocker arm has a swivel joint whose axis of rotation is roughly perpendicular to the axis of rotation of the drive rocker arm, the joint between the drive rocker arm and the connecting lever is a ball joint, and the joint between the connecting lever and the support rocker arm is a swivel joint. Alternatively, the support rocker arm has a swivel joint whose axis of rotation is roughly perpendicular to the axis of rotation of the support rocker arm, the joint between the support rocker arm and the connecting lever is a ball joint, and the joint between the connecting lever and the drive rocker arm is a swivel joint. In the case of these embodiments, a five-joint mechanism can be produced inexpensively, the fifth joint resulting in design and style advantages, e.g., a flatter design, thanks to the fact that it is arranged on a less exposed component, namely one of the rocker arms, and not on the connecting lever, which is the case in the prior art. Furthermore, this reliably keeps tolerances in the axial direction from leading to loss of smoothness of operation and increased wear and tear on the windshield wiper drive. Furthermore, it is possible to orient the axis of rotation of the drive rocker arm and the axis of rotation of the support rocker arm so that they are not parallel to one another.

According to another preferred embodiment, the joint is a ball joint, the joint between the support rocker arm and the connecting lever is a ball joint, and the joint between the connecting lever and the drive rocker arms is a swivel joint.

In this embodiment, the four-joint mechanism has an additional degree of freedom thanks to the fact that two ball joints are used, so that tolerance compensation and offsetting of the axis of rotation of the drive rocker arm with respect to the axis of rotation of the support rocker arm relative to one another can be achieved without any difficulty. Furthermore, the design is particularly simple, and no expensive joint is required. Cost advantages can be achieved thanks to the simple design and the ease of assembly. Because there is no fifth joint, the design can be particularly flat, which ensures an attractive appearance.

DETAILED DESCRIPTION

Figure 1:
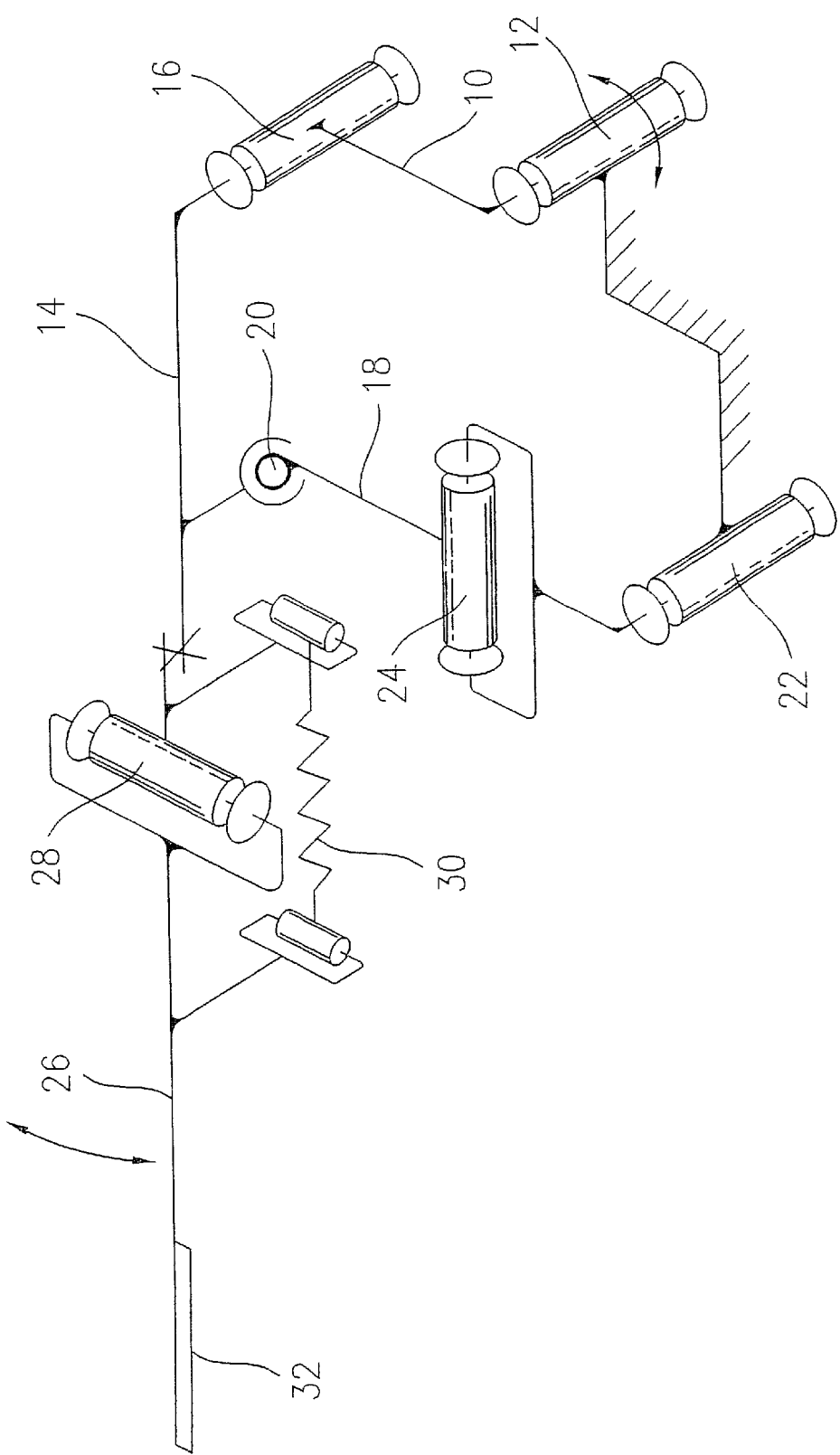
FIG. 1 schematically shows a windshield wiper drive according to a first embodiment of the present invention.

FIG. 1 schematically shows a windshield wiper drive according to a first embodiment. It includes drive rocker arm 10, which is mounted immovably with respect to the vehicle in drive rocker arm swivel joint 12. Drive rocker arm 10 can be moved in a back-and-forth movement by a windshield wiper motor (not shown).

Connecting lever 14 is connected to drive rocker arm 10 via drive joint 16. In this instance, drive joint 16 is a swivel joint. A support rocker arm 18 is connected to connecting lever 14 via a support joint 20, which in this instance is a ball joint. Support rocker arm 18 is mounted immovably with respect to the vehicle via joint 22, which in this instance is a swivel joint. Between support joint 20 and joint 22, support rocker arm 18 has support rocker arm swivel joint 24, whose axis of rotation is roughly perpendicular to the swivel axis defined by joint 22. Thanks to support rocker arm swivel joint 24, support joint 20 can swivel in a plane that is defined by the swivel axis of joint 22 and support joint 20.

A windshield wiper arm 26 is connected to connecting lever 14 in a manner that is known heretofore, a windshield wiper arm swivel joint 28 and a tension spring 30 being provided so that windshield wiper blade 32 that is mounted on windshield wiper arm 26 can be applied to a pane to be cleaned.

Figure 2:
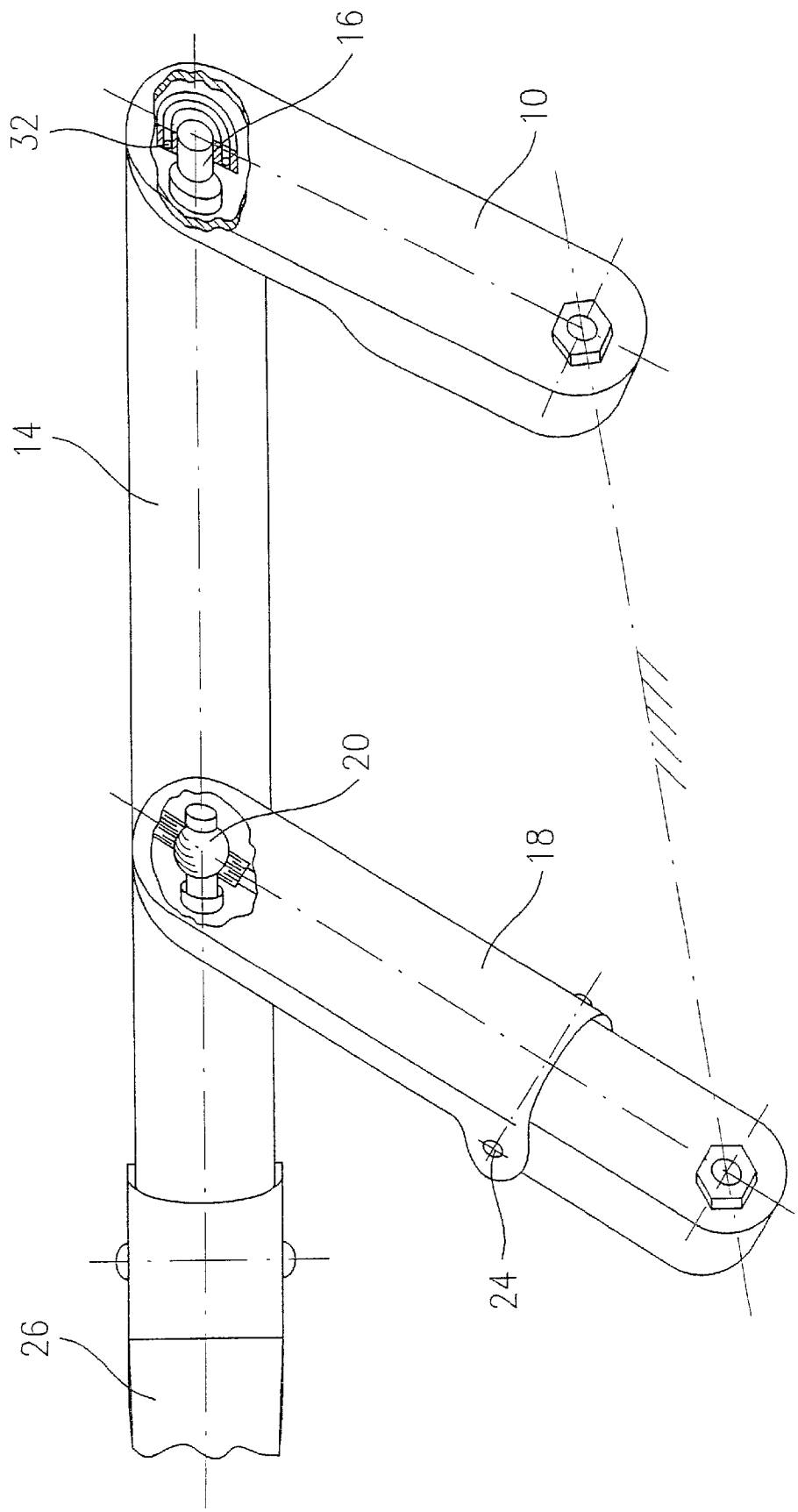
FIG. 2 shows, in perspective view, the drive rocker arm, the support rocker arm, and the connecting lever of the windshield wiper drive shown in FIG. 1.

As shown in FIG. 2, drive joint 16 is embodied as a pivot joint that has ball bearing 32, so as to reduce frictional losses.

As is clearly shown in FIG. 2, support rocker arm swivel joint 24 is in an area close to joint 22 so that it can be covered by an engine hood that is adjacent to the windshield wiper drive. One can also see from the figure that the support rocker arm swivel joint is very flat in design.

Figure 3:
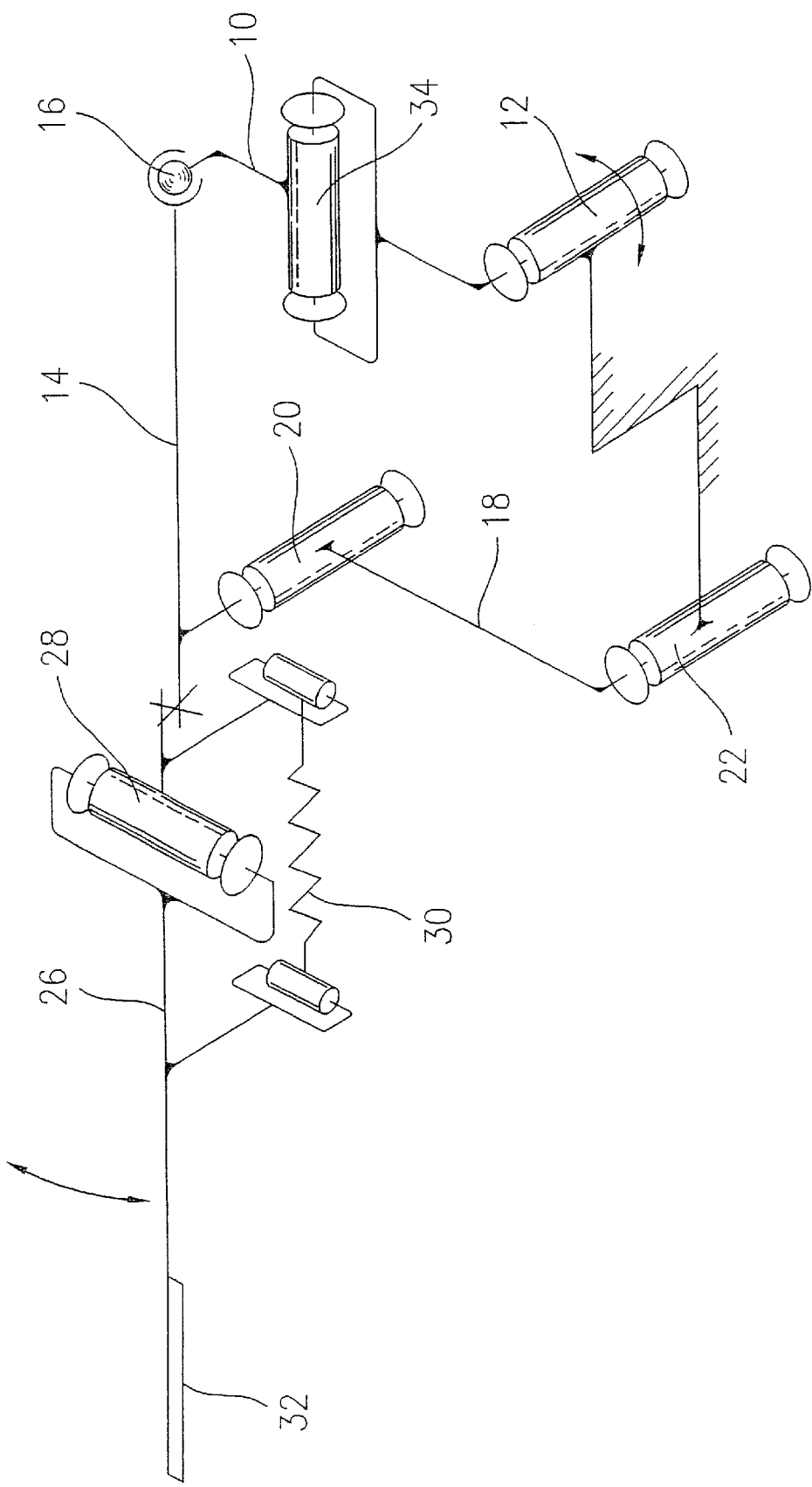
FIG. 3 schematically shows a windshield wiper drive according to a second embodiment of the present invention.
Figure 4:
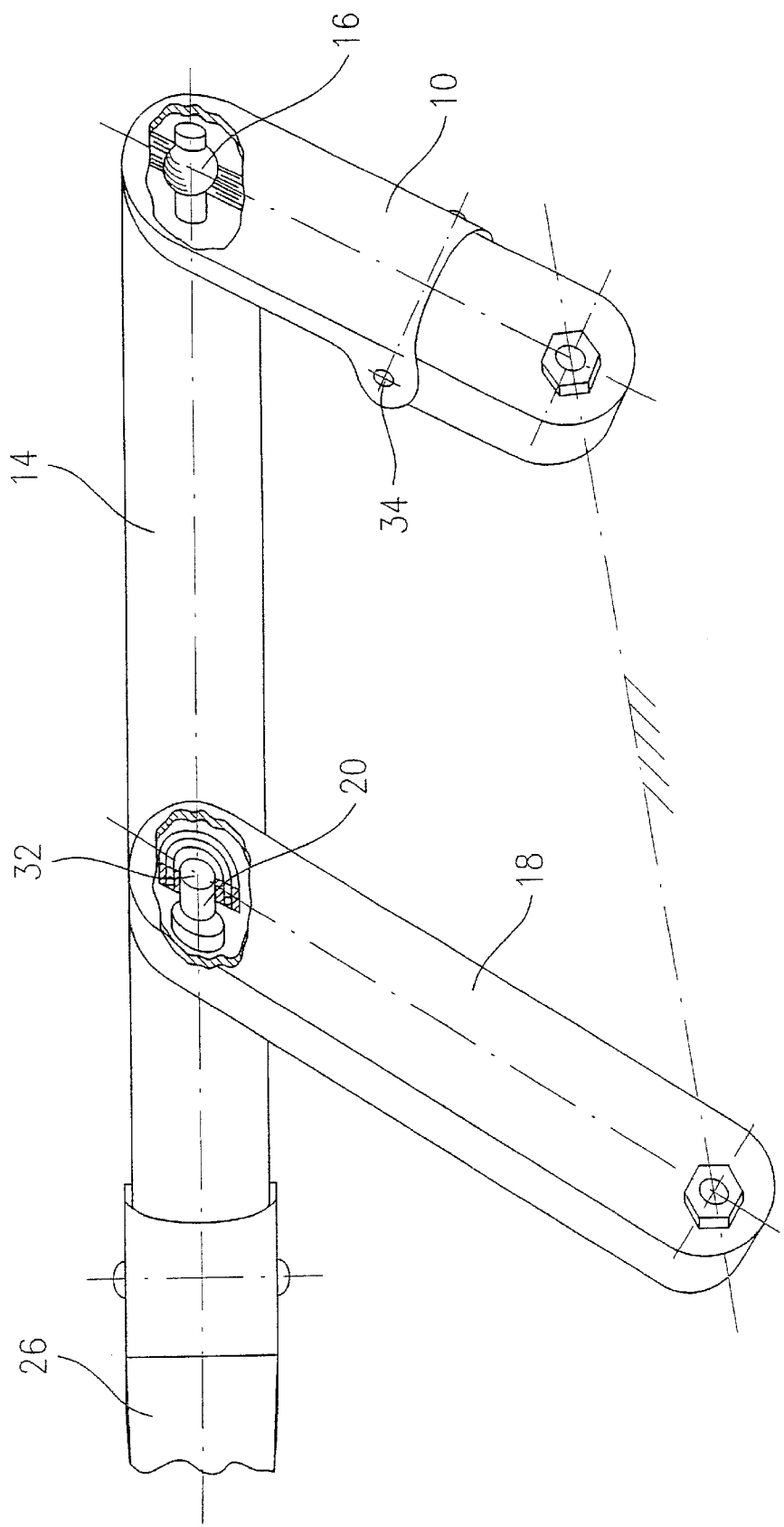
FIG. 4 shows, in perspective view, the drive rocker arm, the support rocker arm and the connecting lever of the windshield wiper drive shown in FIG. 3.

FIGS. 3 and 4 show a windshield wiper drive according to a second embodiment. The same reference numbers are used for components that were indicated with reference to the first embodiment; reference is also made to the above explanation.

The second embodiment also involves a five-joint mechanism. However, the arrangement of the joints for the drive rocker arm and support rocker arm has been swapped relative to the first embodiment: Thus support joint 20 is embodied as a swivel joint, and drive joint 16 is in this instance a ball joint. Furthermore, in this instance the drive rocker arm has a swivel joint, namely drive rocker arm swivel joint 34.

Figure 5:
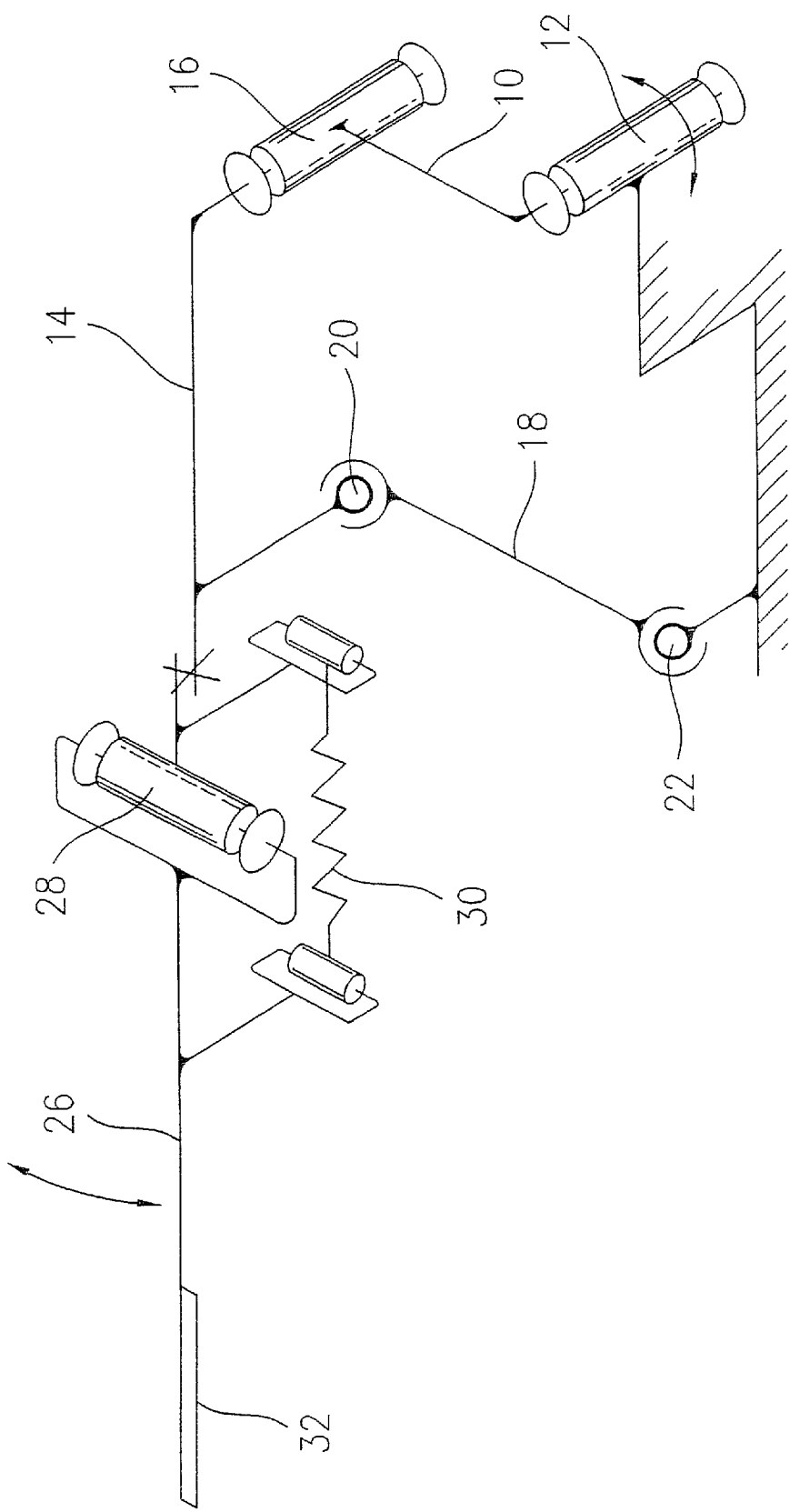
FIG. 5 schematically shows a windshield wiper drive according to a third embodiment of the present invention.
Figure 6:
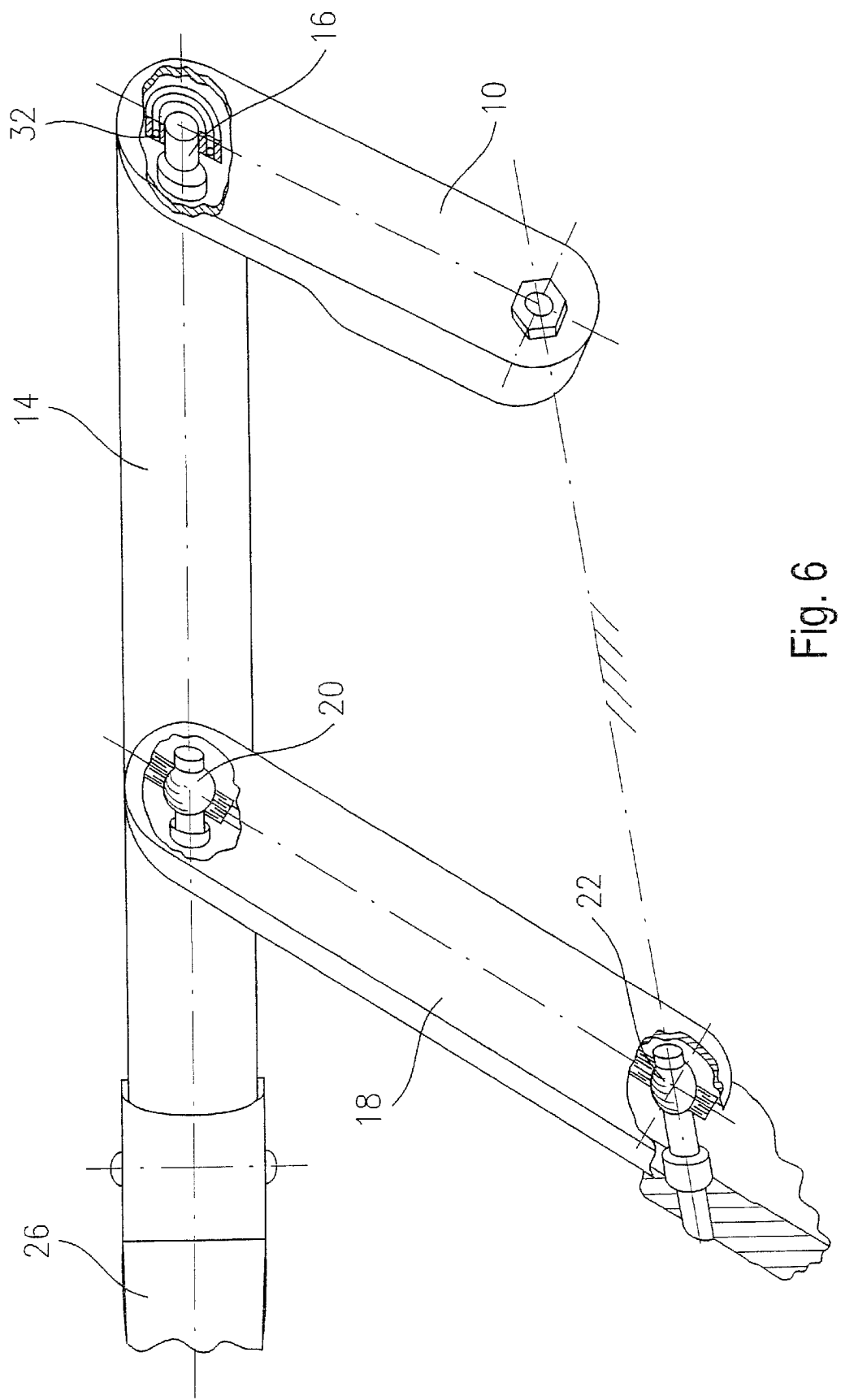
FIG. 6 shows, in perspective view, the drive rocker arm, the support rocker arm and the connecting lever of the windshield wiper drive shown in FIG. 5.

FIGS. 5 and 6 show a windshield wiper drive according to a third embodiment. The same reference numbers are used for components that were indicated with reference to the previous embodiments; reference is also made to the above explanations.

By contrast with the first two embodiments, the third embodiment is a four-joint mechanism; thus neither drive rocker arm 10 nor support rocker arm 18 has a swivel joint. However, to prevent distortion of the windshield wiper drive, both joint 22 and support joint 20 are embodied as ball joints. Thus with minimal production expenditure it is possible to ensure ease of assembly and also ensure that the axes of rotation of swivel joints 12, 22 can be offset relative to one another.

What is claimed is:

1. A windshield wiper drive comprising:
    a swivelably mounted drive shaft;
    a drive rocker arm immovably attached to the drive shaft;
    a connecting lever;
    a first joint connecting the connecting lever to the drive rocker arm;
    a support rocker arm;
    a second joint connecting the support rocker arm to the connecting lever;
    a blind joint mounting the support rocker arm; and
    a windshield wiper arm connected to the connecting lever,
    wherein one of the first and second joints is adapted to be swiveled in a plane defined by an axis of rotation of a respective one of the drive rocker arm and the support rocker arm and by the one of the first and second joints, and
    wherein another of the first and second joints is fixed in a plane defined by an axis of rotation of a respective another of the drive rocker arm and the support rocker arm and by the another of the first and second joints.

2. The windshield wiper drive according to claim 1, wherein the drive rocker arm has a swivel joint having an axis of rotation substantially perpendicular to an axis of rotation of the drive rocker arm, the first joint being a ball joint, the second joint being a swivel joint.

3. The windshield wiper drive according to claim 1, wherein the support rocker arm has a swivel joint having an axis of rotation substantially perpendicular to an axis of rotation of the support rocker arm, the second joint being a ball joint, the first joint being a swivel joint.

4. The windshield wiper drive according to claim 1, wherein the blind joint is a ball joint, the second joint is a ball joint, and the first joint is a swivel joint.

5. The windshield wiper drive according to claim 4, wherein the swivel joint is a pivot joint.

6. The windshield wiper drive according to claim 5, wherein the pivot joint has a ball bearing.

* * * * *